Nov. 2, 1943.    F. M. POTGIETER ET AL    2,333,553
SLIP CLUTCH FOR POWER TAKE-OFFS
Filed Sept. 10, 1941
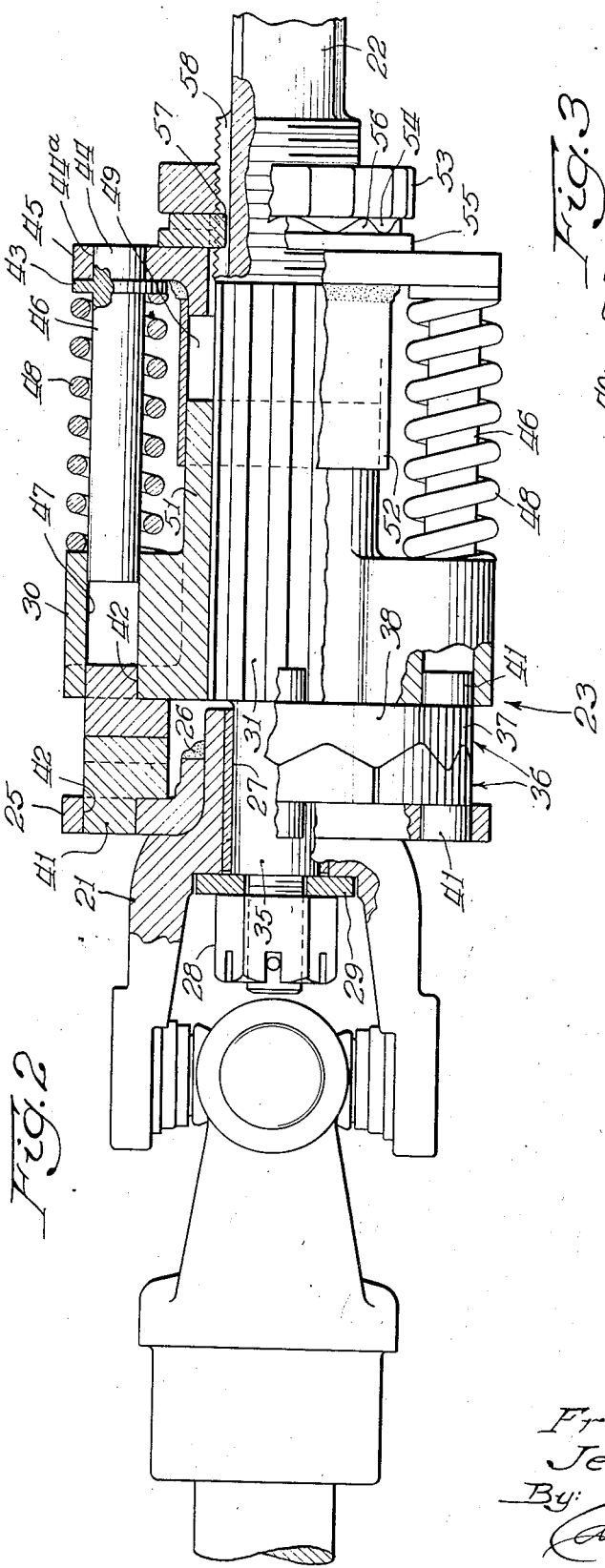
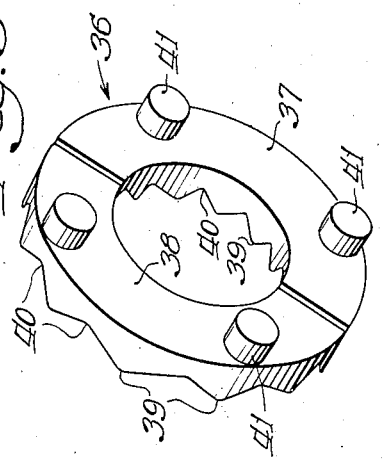
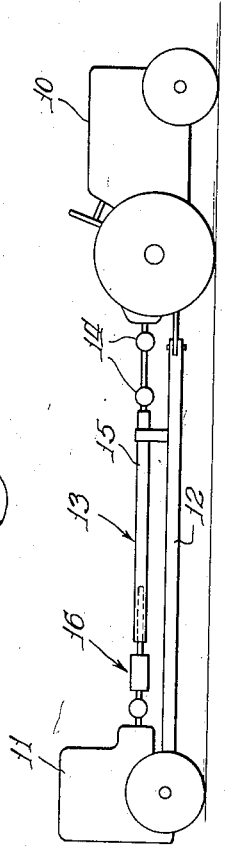
Inventors:
Fred M. Potgieter and
Jens D. Larsen.
By Edward C. Fitzhaugh
Atty.

Patented Nov. 2, 1943

2,333,553

UNITED STATES PATENT OFFICE 2,333,553

SLIP CLUTCH FOR POWER TAKE-OFFS

Fred M. Potgieter and Jens D. Larsen, Rockford, Ill., assignors to Borg-Warner Corporation, Chicago, Ill., a corporation of Illinois Application September 10, 1941, Serial No. 410,285

11 Claims. (Cl. 64—29)

This invention relates to clutches and particularly to an improved construction of overload release clutch.

Tractor drawn trailer tools are now largely operated by means of a power take-off from the tractor as differentiated from former arrangements wherein power was obtained from the operation of the wheels of the trailer itself. In these power take-off assemblies it has been found necessary to provide for the normal transmission of a predetermined torque but to include means responsive to the occurrence of torque load in excess of the normal torque load for permitting relative rotation between the driving and driven elements. Examples of equipment requiring the provision of such an overload release clutch include tractor drawn trailer devices such as farm implements and road working implements wherein it is important that the trailer mechanism not be subjected to excess operating torque.

It is in the above relations that the present invention has particular application and it is a general object to provide an improved assembly which is both efficient in its operation and economical to manufacture. It is a more particular object to provide an improved clutch assembly of the present type wherein those elements commonly subject to wear and breakage may be readily moved and replaced. More specifically it is an object to provide for the removal and replacement of such parts without completely breaking or separating the line of shafting between the source of power and the tool or mechanism operated by the power take-off assembly. It is a still further detailed object to provide an overload release clutch wherein a plurality of readily removable clutch springs are arranged to be adjusted for greater or less compression load, by a single adjusting nut.

Another object is to provide an overload release clutch embodying a plurality of clutch springs disposed within the diameter of the periphery of the clutch jaws so as to reduce overall diameter and provide thrust in direct line with the clutch jaws.

A further object is to provide a slip clutch having an axially movable jaw support member spaced from a spring abutment member, wherein means is provided for covering and protecting the portion of the shaft between the support and abutment members, which would otherwise be exposed to the weather.

The above and other objects, advantages, and uses of the present invention will become apparent from a reading of the following specification taken in connection with the accompanying drawing forming a part thereof and wherein:

Fig. 1 is a schematic elevation indicating a general arrangement of tractor and tractor-drawn trailer incorporating a power take-off line of shafting with our invention incorporated therein;

Fig. 2 is an enlarged broken-away axial section of the universal joint yoke and overload release clutch assembly shown in Fig. 1 incorporating our invention; and Fig. 3 is an isometric view of one clutch tooth assembly, there being two identical assemblies arranged to be mounted face to face with the teeth of one in engagement with the teeth of the other.

Referring in greater detail to the figures of the drawing, 10 indicates generally a tractor arranged to pull a trailer assembly indicated at 11 through a draft connection 12, the trailer assembly 11 incorporating certain mechanism requiring power which is transmitted thereto by a power take-off assembly from the tractor 10 indicated at 13. This power take-off assembly 13 is shown as comprising universal joints 14, tubular shaft 15 and our improved overload release clutch assembly indicated generally at 16, which may also include a universal joint or part thereof as will appear. As may often occur, the mechanism forming part of trailer 11 sometimes becomes jammed as with improper feeding of the material being operated upon under which condition it is quite undesirable that excess torque be transmitted through power take-off assembly 13. With the arrangement herein disclosed, any torque in excess of that for which assembly 16 is adjusted, tubular shaft 15 will merely rotate without causing a corresponding turning of the trailer mechanism. For all torque loads below that for which assembly 16 is adjusted, torque will be transmitted to trailer 11 and the mechanism contained thereon operated to perform its usual function.

With further detailed reference to Figs. 2 and 3, the preferred embodiment of our invention disclosed includes yoke member 21, arranged for driving connection with one end of a torque transmitting shaft 22 through the medium of an overload release clutch assembly indicated generally at 23.

The clutch assembly 23 comprises a radially extending flange-like clutch jaw supporting member 25 embracing yoke 21 and welded thereto as at 26. It will of course be understood that the jaw supporting member 25 may be provided on the yoke 21 in any known manner other than that indicated such, for example, as being formed as part of the yoke itself. It is equally apparent that while the yoke 21 preferably forms part of a universal joint, this construction is merely preferable but not indispensable to the present invention, since the yoke member 21 may readily form part of any other type of torque transmitting element, such as a rigid shaft, the necessary universal joint being located therebeyond.

The shaft 22 has a reduced end trunnion 35 journalled in the yoke member 21 and secured therein against axial withdrawal by means of a nut 28 threaded on the end of the shaft. An end thrust washer 29 is preferably interposed between the nut 28 and the yoke 21 and a bearing bushing 27 is preferably interposed between the trunnion 35 and the yoke 21. Adjacent the trunnion 35, the shaft 22 is formed with a splined region 31 on which is mounted, in axially spaced relation to the support 25, a second jaw supporting member 30. The support 30 is formed with internal splines meshing with the splines of the shaft region 31 so as to form a driving connection between the support 30 and the shaft 22 to permit axial movement of the support on the shaft.

Torque is normally transmitted between the yoke 21 and shaft 22 through the medium of slip clutch jaws indicated generally at 36, one of which is carried by the support 25 and the other of which is carried by the support 30. Each of the jaws 36 is in the form of an annulus comprising a plurality of circumferentially separated jaw sections. In the form of the invention shown, each jaw is divided into two sections 37 and 38 respectively, each approximately 180° in extent, although it will be understood that a larger number of sections may be employed with equal effectiveness and that the sections need not necessarily be equal in arcuate extent.

The jaws are provided with axially extending cam-like teeth 39 each adjacent pair of which defines a valley 40 into which the teeth 39 of the cooperating jaw is received.

Each of the jaw sections 37 and 38 is provided with a plurality of pegs 41 projecting axially from its rear face (the face opposite the teeth 39). The pegs 41 are received in recesses or openings 42 in the respective supports 25 and 30 and the jaws are thus supported against radial displacement. While the pegs 41 and recesses 42 are shown as being cylindrical, any other cross-sectional shape may be employed. As will be pointed out more in detail hereinafter, axial separation of the supports 25 and 30 permits the pegs 41 to be withdrawn from the openings 42, whereupon the jaw sections 37 and 38 may be separated radially and thereby removed from the assembly.

While the teeth 39 as shown are formed for slip in both directions, it will be understood that the invention may as well be embodied in a clutch having slip in only one direction.

The support 30 is urged axially toward the support 25 in order to normally maintain the clutch jaws in clutching engagement. To this end, we provide an abutment member 45 in the form of a ring loosely receiving the shaft 22 and carrying a plurality of axially extending pins 46 each having an integral collar 43 abutted against the ring 45 and an end portion 44 projecting beyond the collar 43 and removably received in an opening 44a in the ring 45. The opposite end of each pin 46 is slidably received in a bore 47 in the support 30, which bore is preferably formed as a continuation of a recess 42 so as to simplify the construction. Carried on the respective pins 46 and compressed between the axially spaced support 30 and abutment ring 45, are a plurality of compression springs 48 which furnish the yielding pressure for urging the clutch jaws into cooperating engagement. As will be pointed out more in detail hereinafter, the removable fitting of the pins 46 in the abutment ring 45 permits the pin and spring assembly to be quickly removed by backing off the abutment ring 45.

With the arrangement shown, the center lines of the springs are disposed within the diameter of the periphery of the clutch jaws, producing the double advantage of reducing the overall diameter of the assembly and having the lines of thrust intersect the clutch teeth.

Since the support 30 must slide upon the spline shaft section 31, and the torque load at which the clutch will slip depends upon the combined resistance of the springs 48 and the friction in the spline connection, it is necessary that the latter factor be maintained substantially uniform in order that the slip load be maintained at a substantially uniform level. It is therefore important to lubricate and protect the spline connection against rusting. To this end, the support 30 is formed with an axially extending hub portion 51 which is telescoped by a sleeve 52 carried on the abutment ring 45. The sleeve 52 bridges and closes the space between the end of the hub 51 and the abutment ring 45 so as to completely cover the portion of the spline section 31 which would otherwise be exposed and so as to form a lubricant chamber 49 which is filled with a suitable lubricant for lubricating the spline connection.

The abutment ring 45 is normally supported against axial recession under the reaction thrust of the springs 48 by means of a nut 53 threaded upon a threaded section of the shaft 22, and a lock-washer 55 interposed between the nut 53 and the abutment ring. The lock-washer 55 and nut 53 are formed with cooperating undulating teeth 56 and 54 respectively, and the lock-washer has a key 57 extending into a keyway 58 in the shaft 22 so as to maintain it against rotation on the shaft, whereby the nut 53 may be held in any desired position of adjustment.

It will now be apparent that by advancing the nut 53 on the shaft threads, the abutment ring 45 will be moved toward the support 30, increasing the compression of the springs 48 and thereby raising the load at which slip will occur. Conversely, by backing off the nut, the load may be decreased.

By unthreading the nut 53 completely from the threaded portion of the shaft, the entire assembly including the nut, the lock-washer, the abutment ring and the support 30 may be slid axially on the shaft until the spacing between the supports 30 and 25 is sufficient to permit axial withdrawal of the pegs 41 from their cooperating openings 42. Thereupon the jaw sections may be completely removed from the assembly by the simple act of separating them radially. In former clutches of this general character, it has been necessary to completely remove the entire clutch assembly from an end of the shaft, necessitating the disassembly of the shaft from the universal joint yoke. The present invention permits the clutch jaws to be removed without disturbing the universal joint assembly at all and without removing any other portion of the clutch assembly from the shaft, it being only necessary to withdraw the shiftable support member and its associated parts axially on the shaft for a short distance so as to permit withdrawal of the pegs 41 from the respective support members. It may be noted further that when the nut 53 is sufficiently retracted, the abutment ring 45 may be drawn away from the support 30 so as to permit the respective ends of the pins 46 to be withdrawn from the bores 47 and the openings 44a respectively, whereupon the pin and spring units may be removed from the assembly.

The integral collars 43 on the pins 46, confined between the springs 48 and abutment ring 45, maintain the pins 46 against axial displacement in either direction when in assembly, and yet do not in any way interfere with the removal of the pins and springs in the manner above described. It may be noted at this point that this construction permits the employment of a single adjustment nut for securing all of the pin and spring units in assembly, and permits the simultaneous adjustment of compression of all of the springs through a single adjustment element. This is a decided advantage over the use of individual adjustment connections between each of the pins and the members in which they are supported, since it is much simpler, saves time, and assures uniform adjustment of all the springs.

It will now be apparent that we have provided an improved and simplified slip clutch construction particularly adapted for use under conditions where the parts are exposed to weather such as for example in connection with power driven farm machinery. It is further apparent that the invention provides for protection of the slip joint between the axially shiftable jaw support and its shaft, against the corroding action of the weather and for the proper lubrication of this joint. It is further apparent that our improved slip clutch provides for removal of worn or defective clutch jaws or clutch springs and spring mounting pins with maximum dispatch and minimum difficulty, it being necessary to back off only a single adjusting and securing nut in order to accomplish this result. It is further apparent that our invention provides for adjustment of a plurality of compression springs simultaneously through the medium of a single adjusting element, with maximum dispatch and with uniform adjustment of all springs assured. In addition, the invention provides for maximum compactness diametrically and for centering the spring thrust directly behind or in line with the clutch jaws.

While the present invention has been disclosed in connection with certain specific embodiments thereof, it will be understood that these have been presented by way of example only and not by way of limitation, it being intended that the invention be defined by the appended claims.

We claim:

1. In an overload release clutch, driving and torque transmitting elements, a jaw support mounted on one of said elements and drivingly connected thereto, annular cooperating slip clutch jaws carried by said support and by the other of said elements respectively, each of said jaws comprising a plurality of circumferentially separated sections, means connecting said jaws to said support and said other element respectively in such a manner as to restrain said jaws from radial displacement and yet to permit said jaws to be readily disconnected therefrom by axial separation of the jaws from said support and said other element, said support being axially shiftable upon its torque transmitting element so as to permit such axial separation, and means yieldingly resisting such axially shifting movement, said last-named means functioning both to normally maintain the jaws in driving engagement while being adapted to yield to permit the jaws to release their driving engagement under overload, and also to normally maintain the jaws connected to said support and said other element respectively while being adapted to yield to permit said axial separation.

2. In an overload release clutch, driving and driven torque transmitting elements, a jaw support axially shiftable on one of said elements, annular cooperating slip clutch jaws carried by said support and said other element respectively, said jaws comprising a plurality of circumferentially separated sections, means connecting said jaws to said support and said other element respectively in such a manner as to support said jaws against radial displacement and yet to permit said jaws to be readily disconnected therefrom by axial separation of said jaws from said support and said other element, an abutment member carried by said one torque transmitting element, axially spaced from said support on the side thereof remote from the jaws carried by said other element, and a plurality of compression springs interposed between said abutment and said support, held in assembly therewith as long as said abutment and support are maintained in fixed axially spaced relation, and yieldingly urging the support in the direction for normally maintaining engagement of said clutch jaws while permitting them to become disengaged under overload and for normally maintaining the connection between said jaws and said support and other element respectively, said clutch jaws, by preventing movement of said support away from said abutment, serving to maintain said springs in assembly with said support and abutment and, when removed, permitting axial movement of said support away from said abutment which in turn permits disassembly of said springs.

3. An overload release clutch as defined in claim 2, including a single adjusting nut threaded on said one element and adjustably positioning said abutment member to receive the reaction thrust of all said springs.

4. An overload release clutch as defined in claim 2, wherein said support and abutment comprise a pair of members, one having an axially projecting hub and the other including a sleeve telescoping said hub and covering that portion of said one element which extends between said hub and said sleeve carrying member so as to protect the same against the weather, said hub and sleeve being disposed radially inwardly of said spring, so as not to interfere with the removal of the springs.

5. An overload release clutch as defined in claim 2, wherein said one element has a spline portion on which said abutment and support are splined, said abutment and support comprising a pair of members, one having a hub and the other having a sleeve telescoping said hub and forming therewith a closed lubricant containing chamber about that portion of said spline section which extends between said hub and the sleeve carrying member, said hub and sleeve being disposed inwardly of said springs so as not to interfere with the removal thereof.

6. In an overload release clutch, driving and driven torque transmitting elements, a jaw support axially shiftable on one of said elements, annular cooperating slip clutch jaws carried by said support and said other element respectively, each of said jaws comprising a plurality of circumferentially separated sections, means connecting said jaws to said support and said other element respectively in such a manner as to restrain radial displacement of the jaws while permitting them to be readily disconnected therefrom by axial separation, an abutment member carried by said one torque transmitting element and axially spaced from said support on the side thereof remote from the jaw supported by said other member, a plurality of compression springs interposed between said abutment and said support and yieldingly urging the latter in the direction for normally maintaining engagement of said clutch jaws while permitting them to slip under overload and for normally maintaining the connection of said jaws with said support and other element while yieldingly permitting axial movement of said support toward said abutment and thereby allowing said jaws to be disconnected from said support and another element respectively, and a plurality of pins extending axially through said springs and interengaged at their ends with said abutment and support respectively, in such a manner as to permit axial movement of the support toward the abutment while being supported and in turn supporting said springs against radial displacement, and in such manner as to be detachable from said support and abutment only upon axial separation of said support and abutment, said jaws, when in place, preventing the last-mentioned axial separation and the removal of said jaws permitting said axial separation and the consequent removal of the pins and springs.

7. An overload release clutch as defined in claim 6, wherein the ends of said pins are received in recesses in the abutment and support respectively, the recesses of the support being of greater depth than the normal projection of the pins thereinto so as to permit the axial movement of said support toward said abutment necessary for allowing removal of the jaws.

8. An overload release clutch as defined in claim 6, wherein said torque and abutment comprise a pair of members having axially opening recesses receiving the respective ends of the pins so as to form the supporting connection between the pins and said support and abutment, wherein one set of recesses is of greater depth than the normal projection of the pins thereinto so as to permit the axial movement of said support toward said abutment necessary for allowing the removal of the jaws, and wherein the pins are formed with radial projections engaged between the other member and the adjacent ends of the spring so as to normally restrain the pins against axial movement in the recesses.

9. An overload slip clutch as defined in claim 6, wherein the depressions in said support member are in the form of openings extending axially therethrough and wherein the means connecting adjacent jaws to said support member comprises lugs formed on the jaw sections and extending into said openings.

10. An overload release clutch as defined in claim 1, wherein one of said torque transmitting elements comprises a shaft having an end portion piloted in the other of said elements, and connected thereto against axial separation, the piloted portions of said elements being extended through the space circumscribed by said jaws.

11. An overload clutch for use under conditions wherein it is exposed to the weather comprising driving and driven torque transmitting elements, one of said elements comprising a shaft having a splined portion, a jaw support member splined upon said splined portion and axially shiftable thereon, cooperating slip clutch jaws carried by said support member and the other of said torque transmitting elements respectively, an abutment member carried by said shaft in spaced relation to said support member, one of said members being formed with an axially projecting hub, a sleeve on the other of said members telescoping said hub, substantially sealed thereto and axially movable relative thereto, and a plurality of compression springs interposed between said abutment member and said support member and urging the latter in the direction for maintaining engagement of said jaws, said compression springs occupying the annular space immediately surrounding said hub and sleeve and being accommodated largely within the diameter of the outer periphery of said jaws.

FRED M. POTGIETER.
JENS D. LARSEN.